May 10, 1966 S. DUINKER 3,249,987

METHOD OF MANUFACTURING MAGNETIC HEADS

Filed March 5, 1962

INVENTOR
SIMON DUINKER
BY
AGENT

United States Patent Office 3,249,987
Patented May 10, 1966

3,249,987
METHOD OF MANUFACTURING
MAGNETIC HEADS
Simon Duinker, Emmasingel, Eindhoven, Netherlands, assignor to North American Philips Company, Inc., New York, N.Y., a corporation of Delaware
Filed Mar. 5, 1962, Ser. No. 177,586
Claims priority, application Netherlands, Mar. 30, 1961, 263,100
8 Claims. (Cl. 29—155.5)

The invention relates to a method of manufacturing magnetic heads, in particular heads with a very narrow gap, for example a gap having a length of from 1 to 2 microns.

To achieve a satisfactory efficiency, the gap height of such heads should match the small gap length. A suitable height is, for example, 50 microns with a tolerance of ±5 microns. The area of contact between the pole-pieces is so small that their connection is mechanically weak even with the use of a thin layer of glass or enamel as an adhesive in the gap, which usually forms a relatively strong connection. This drawback is frequently obviated by providing a reinforcing bar of non-magnetic material having a high softening point, for example glass, engaging the inner portion of the gap. However, since the inner portion of the gap is generally neither accessible nor visible, it is very difficult to maintain the gap height with certainty within the small tolerance of ±5 microns.

A method which obviates this disadvantage is disclosed in the co-pending application Serial No. 177,453, filed March 5, 1962, and consists of grinding and polishing the poleface prior to the provision of the reinforcing bar, after which the head, including the poleface, is secured in an accurately fitting counter jig, the gap being subsequently produced by grinding or cutting until the tool used approaches the jig so as to be spaced therefrom by a distance equal to the desired gap height. This method has the disadvantage that in mass manufacture a plurality of jigs are required, since the heads remain in the jigs until they are finished.

The method in accordance with the present invention requires no jigs and achieves a strong mechanical connection while accurately maintaining proper gap height. According to the invention at least one of the two plates used for the polepieces is provided with a V-shaped cross groove, a reinforcing bar of non-magnetic material is secured in the groove and fits therein but is longer than the groove and together with the contact face of the plate is ground and polished before the two plates are secured to one another.

The required gap height may be obtained by grinding and polishing the poleface, the limb which projects beyond the assembly of the plates and marks the inner end of the gap being used as a reference line.

In order that the invention may readily be carried into effect, embodiments thereof will now be described, by way of example, with reference to the accompanying diagrammatic drawing, in which.

Figure 1:
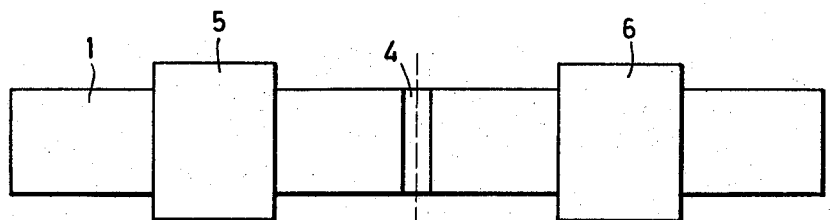
FIGURE 1 is a plan view and FIGURE 2 a side elevation part sectional view of a ferrite plate provided with two V-shaped cross grooves in which reinforcing bars are secured.
Figure 2:
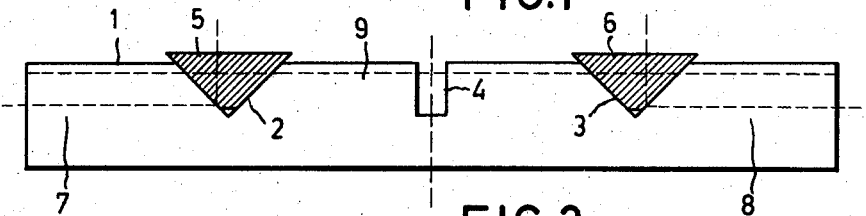

A ferrite plate 1 shown in FIGURES 1 and 2 is provided with two V-shaped grooves 2 and 3 symmetrical with respect to the center and with a central groove 4 of rectangular cross-section.

Reinforcing bars 5 and 6 of triangular cross-section are secured in the grooves 2 and 3; the bars 5 and 6 preferably are composed of a ferrite material, the Curie-point of which is lower than room temperature, for example Ni-Zn ferrite material having a high proportion of zinc. They may, however, be composed of any non-magnetic material having a high melting point, the coefficient of expansion of which is at least substantially equal to that of the ferrite material of the plate 1. It should be noted that ferrite, which is the material most commonly used for this purpose is only mentioned by way of example.

For a reason which will be explained more fully hereinafter, the bars 5 and 6 are slightly longer than the grooves 2 and 3 from which they project at either end. This is shown in FIG. 1.

The angle of aperture of the grooves 2 and 3 preferably is about 90° and the bars 5 and 6 are secured in the grooves with the aid of a high melting solder or glass. In order to prevent small rounded parts in the vertices of the grooves 2 and 3 from interfering with a satisfactory fit of the bars 5 and 6, the sharp edges of the bars to be accommodated in the grooves preferably are slightly flattened or rounded.

The plate 1 may be machined along the dash lines 7 and 8 and subsequently is ground and polished to the shape indicated by dash line 9 after which it is ready to be secured, with the interposition of a gap-forming thin layer of an adhesive such as glass or enamel, to a second similarly prepared plate 10. The assembly then has the appearance shown in FIGURE 3.

In order to prevent the plates 1 and 10 from being relatively shifted in the following operation, a key 11 preferably made of ferrite is driven into the aligned right-angled grooves 4.

Figure 3:
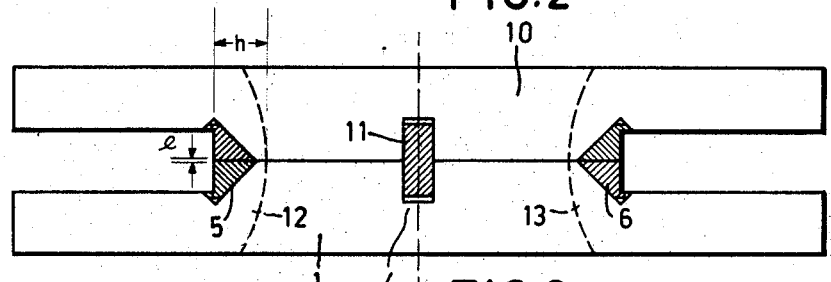
FIGURE 3 shows two such plates which have been ground and polished and subsequently secured to one another with the interposition of a gap-forming adhesive.
Figure 4:
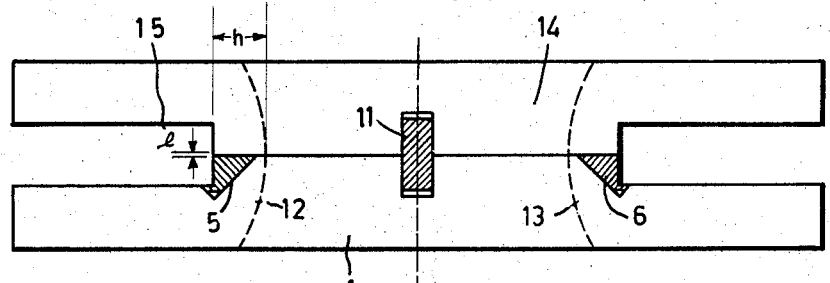
FIGURE 4 shows a modified embodiment in which only one of the two plates has been provided with V-shaped grooves and fitting reinforcing bars.

By cutting the two plates, thus united to form a rigid structure, along faces 12 and 13 indicated by broken lines two heads are obtained of which only the polefaces have to be finished. The parts of the bars 5 and 6 projecting beyond the plates enable the gap height to be given the desired value in a simple and reliable manner by grinding and polishing the poleface, since the bar limb nearest the poleface indicates the point at which the actual gap ends, so that grinding or polishing has only to be continued until the tool used has approached the said limb so as to be spaced therefrom by a distance equal to the desired gap height. The dimensions of gap length and height are shown in FIGS. 3 and 4 and are designated as "$l$" and "$h$," respectively. It should be noted that the length dimension is shown exaggerated for the sake of illustration.

FIGURE 4 shows a modified embodiment, in which only the plate 1 is prepared and provided with reinforcing bars 5 and 6 in the manner described with reference to FIGURES 1 to 3. The counter plate 14 is ground entirely flat along its gap forming contact surface with the exception of the ends which are provided with an outline 15 for the sake of symmetry nad to accommodate a winding (not shown) of the head.

The method described has the additional advantage that the degree of accuracy achieved does not depend upon a correct shape of the gap face 9. Even if this face should be ground slightly oblique, the reference line formed by the projecting limb of the bar still indicates precisely the inner end of the gap.

A further advantage is that the reinforcing bars may be smaller than those heretofore used so that the windings may be provided in closer proximity to the gap and the assembly becomes more compact and hence more efficient.

Obviously, many modifications of the invention are possible in the light of the above teachings. It is therefore to be understood that, within the scope of the appended claims, the invention may be practiced otherwise than as specifically described.

What is claimed is:

1. A method of manufacturing pole pieces of a magnetic head having a very short gap length and a precise gap height, comprising: cutting a cross groove in a first ferrite plate surface and spaced from one end thereof, said groove extending across the entire lateral dimension of said plate, securing permanently a cooperating reinforcing bar of non-magnetic material longer than said lateral dimension in said groove, said bar thus having a limb extending beyond said plate to act as a reference to attain said gap height, machining a portion of said plate and a portion of said bar to a predetermined configuration to form a first surface extending from said one end, thereby defining coil mounting means, grinding and polishing the remaining portions of said plate surface and bar to form a second continuous planar surface, grinding and polishing one planar surface of a second magnetic plate, securing permanently said ground and polished surfaces to each other with the interposition of a gap-forming thin layer of nonmagnetic adhesive to define the gap length, cutting the resultant assembly through the plates substantially parallel to said limb to form a poleface, and grinding and polishing said poleface until the correct gap height is reached by using said extending limb as a reference to attain said correct gap height.

2. A method as claimed in claim 1, wherein said cross groove is V-shaped and has an aperture angle substantially equal to ninety degrees.

3. A method as claimed in claim 1, wherein said reinforcing bar is composed of a ferrite material having a Curie-point lying below room temperature.

4. A method of manufacturing pole pieces of a magnetic head having a very short gap length and a precise gap height, comprising: cutting a cross groove in a first magnetic plate surface and spaced from one end thereof, said groove extending across the entire lateral dimension of said plate, securing permanently a cooperating reinforcing bar of non-magnetic material longer than said lateral dimension in said groove, said bar thus having a limb extending beyond said plate to act as a reference to attain said gap height, machining a portion of said plate and a portion of said bar to a predetermined configuration to form a first surface extending from said one end thereby defining coil mounting means, grinding and polishing the remaining portions of said plate surface and bar to form a second continuous planar surface, performing the same operations on a second magnetic plate of substantially the same dimensions, aligning said plates with corresponding portions facing each other, securing permanently the ground and polished surfaces of said plates to each other with the interposition of a gap-forming thin layer of non-magnetic adhesive to define the gap length so that the resultant assembly is symmetrical with respect to said thin layer, cutting the resultant assembly through the plates substantially parallel to said limb to form a poleface, and grinding and polishing said poleface until the correct gap height is reached by using said extending limb as a reference to attain said correct gap height.

5. A method of manufacturing pole pieces of a magnetic head having a very short gap length and a precise gap height, comprising: cutting two V-shaped cross grooves in a first ferrite plate surface and spaced from both ends thereof, each groove extending across the entire lateral dimension of said plate, securing permanently a cooperating reinforcing bar of non-magnetic material longer than said lateral dimension in each groove, each bar thus having a limb extending beyond said plate to act as a reference to attain said gap height, machining portions of said plate and said bars to a predetermined configuration to form first surfaces each extending from one of said ends thereby defining coil mounting means, grinding and polishing the remaining portions of said plate surface and said bars to form a second continuous planar surface, performing the same operations on a second ferrite plate of substantially the same dimensions, aligning said plates with corresponding portions facing each other, securing permanently the ground and polished surfaces of said plates to each other with the interposition of a gap-forming thin layer of non-magnetic adhesive to define the gap length so that the resultant assembly is symmetrical with respect to said thin layer, cutting the resultant assembly through the plates substantially parallel to said limbs to form two polefaces, and grinding and polishing each poleface until the correct gap height is reached by using each extending limb as a reference to attain said correct gap height.

6. A method as claimed in claim 5, wherein said reinforcing bars are composed of a ferrite material having a Curie-point lying below room temperature.

7. A method of manufacturing pole pieces of a magnetic head having a very short gap length and a precise gap height, comprising: cutting two V-shaped cross grooves in a first ferrite plate surface and spaced from both ends thereof, each groove extending across the entire lateral dimension of said plate, securing permanently a cooperating reinforcing bar of nonmagnetic material longer than said lateral dimension in each groove, each bar thus having a limb extending beyond said plate to act as a reference to attain said gap height, machining portions of said plate and said bars to a predetermined configuration to form first surfaces each extending from one of said ends thereby defining coil mounting means grinding and polishing the remaining portions of said plate surface and said bars to form a second continuous planar surface, grinding and polishing one planar surface of a second ferrite plate, securing permanently the ground and polished surfaces of said plates to each other with the interposition of a gap-forming thin layer of non-magnetic adhesive to define the gap length, cutting the resultant assembly through the plates substantially parallel to said limbs to form two polefaces, and grinding and polishing each poleface until the correct gap height is reached by using each extending limb as a reference to attain said correct gap height.

8. A method of manufacturing pole pieces of a magnetic head having a very short gap length and a precise gap height, comprising: cutting two V-shaped grooves and one rectangular cross groove in a first ferrite plate surface and spaced from both ends thereof, each groove extending across the entire lateral dimension of said plate, securing permanently a cooperating reinforcing bar of non-magnetic material longer than said lateral dimension in each V-shaped groove, each bar thus having a limb extending beyond said plate to act as a reference to attain said gap height, machining portions of said plate and said bars to a predetermined configuration, to form first surfaces each extending from one of said ends thereof defining coil mounting means grinding and polishing the remaining portions of said plate surface and said bars to form a second continuous planar surface, performing the same operations on a second ferrite plate of substantially the same dimensions, aligning said plates with corresponding portions facing each other, securing permanently the ground and polished surfaces of said plates to each other with the interposition of a gap-forming thin layer of non-magnetic adhesive to define the gap length so that the resultant assembly is symmetrical with respect to said thin layer, placing a ferrite key in the aperture formed by said rectangular grooves, cutting the resultant assembly through the plates substantially parallel to said limbs to form two polefaces, and grinding and polishing each poleface until the correct gap height is reached by using each extending limb as a reference to attain said correct gap height.

References Cited by the Examiner

UNITED STATES PATENTS

| | | | |
|---|---|---|---|
| 2,706,752 | 5/1955 | Dupy | 179—100.2 |
| 2,945,919 | 7/1960 | Neumann | 179—100.2 |
| 3,145,452 | 8/1964 | Camras | 179—100.2 X |

FOREIGN PATENTS

| | | |
|---|---|---|
| 1,210,094 | 3/1960 | France. |
| 181,974 | 10/1954 | Germany. |

WHITMORE A. WILTZ, *Primary Examiner*.

JOHN F. CAMPBELL, *Examiner*.

C. I. SHERMAN, R. W. CHURCH, *Assistant Examiners*.